(12) United States Patent
Sakaguchi et al.

(10) Patent No.: US 9,956,958 B2
(45) Date of Patent: May 1, 2018

(54) VEHICLE DRIVING CONTROL DEVICE AND CONTROL DEVICE

(71) Applicant: Toyota Jidosha Kabushiki Kaisha, Toyota-shi, Aichi-ken (JP)

(72) Inventors: Eiji Sakaguchi, Susono (JP); Tomoyuki Kuriyama, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 91 days.

(21) Appl. No.: 15/253,253

(22) Filed: Aug. 31, 2016

(65) Prior Publication Data

US 2017/0072951 A1  Mar. 16, 2017

(30) Foreign Application Priority Data

Sep. 10, 2015 (JP) .................................. 2015-178688

(51) Int. Cl.
*B60W 30/14* (2006.01)

(52) U.S. Cl.
CPC ....... *B60W 30/143* (2013.01); *B60W 2420/42* (2013.01); *B60W 2550/14* (2013.01); *B60W 2550/146* (2013.01); *B60W 2720/125* (2013.01); *B60W 2720/28* (2013.01)

(58) Field of Classification Search
None
See application file for complete search history.

(56) References Cited

U.S. PATENT DOCUMENTS

| | | | | |
|---|---|---|---|---|
| 5,871,062 A * | 2/1999 | Desens | .............. | B60K 31/0008 180/169 |
| 7,124,027 B1 * | 10/2006 | Ernst, Jr. | ................ | B60W 30/09 701/301 |
| 9,689,706 B2 * | 6/2017 | Denaro | .............. | G01C 21/3697 |
| 9,776,641 B2 * | 10/2017 | Matsuno | ........... | B60W 50/0225 |
| 9,834,216 B2 * | 12/2017 | Pawlicki | ............... | B60W 30/18 |
| 2005/0216171 A1 * | 9/2005 | Heinrichs-Bartscher | .............. | B60W 30/16 701/96 |
| 2007/0027583 A1 * | 2/2007 | Tamir | .................. | G06O 30/0283 701/1 |
| 2008/0027607 A1 * | 1/2008 | Ertl | ........................ | B60W 30/16 701/36 |

(Continued)

FOREIGN PATENT DOCUMENTS

JP H06-008747 A 1/1994
JP 2003-048450 A 2/2003
(Continued)

*Primary Examiner* — Truc M Do
(74) *Attorney, Agent, or Firm* — Dinsmore & Shohl LLP

(57) ABSTRACT

A vehicle driving control device includes a target speed calculation unit configured to calculate a target speed on the basis of a target lateral acceleration and a curve radius; a speed control unit configured to control the speed of a vehicle on the basis of the target speed and a vehicle speed; and a lane determination unit configured to determine whether a lane on which the vehicle is driving is an overtaking lane on the basis of image information. The target lateral acceleration setting unit sets the target lateral acceleration to be higher than the target lateral acceleration when it is determined that the lane on which the vehicle is driving is not the overtaking lane in a case where it is determined that the lane on which the vehicle is driving is the overtaking lane.

3 Claims, 9 Drawing Sheets

(56) References Cited

U.S. PATENT DOCUMENTS

| | | | | |
|---|---|---|---|---|
| 2010/0315217 A1* | 12/2010 | Miura | ............ | B60W 30/18009 340/436 |
| 2010/0329513 A1* | 12/2010 | Klefenz | ................ | G01C 21/00 382/104 |
| 2011/0029184 A1* | 2/2011 | Brighenti | .......... | B60W 30/0953 701/31.4 |
| 2011/0137535 A1* | 6/2011 | Goto | ......................... | B60T 1/10 701/70 |
| 2012/0019375 A1* | 1/2012 | Kataoka | ............... | B60W 50/14 340/439 |
| 2012/0078484 A1* | 3/2012 | Kato | .................. | B60W 30/143 701/96 |
| 2013/0138320 A1* | 5/2013 | Aso | ...................... | B60W 30/16 701/96 |
| 2013/0304322 A1* | 11/2013 | Isaji | .................... | B62D 15/025 701/41 |
| 2014/0046581 A1* | 2/2014 | Ota | ................. | G08G 1/096716 701/408 |
| 2015/0006028 A1* | 1/2015 | Strauss | .................... | B62D 1/28 701/36 |
| 2015/0105937 A1* | 4/2015 | Waldbauer | ............. | G08G 1/167 701/1 |
| 2015/0154871 A1* | 6/2015 | Rothoff | .................... | G08G 1/22 701/2 |
| 2015/0197249 A1* | 7/2015 | Sakima | ............... | B60W 30/165 701/96 |
| 2015/0224987 A1* | 8/2015 | Tachibana | .............. | G08G 1/166 701/1 |
| 2015/0344034 A1* | 12/2015 | Niino | ................... | B60W 30/16 701/96 |

FOREIGN PATENT DOCUMENTS

| JP | 2008-090654 A | 4/2008 |
|---|---|---|
| JP | 2010-089700 A | 4/2010 |
| JP | 2012-066758 A | 4/2012 |

\* cited by examiner

VEHICLE DRIVING CONTROL DEVICE AND CONTROL DEVICE

CROSS-REFERENCE TO RELATED APPLICATIONS

This application claims priority to Japanese Patent Application No. 2015-178688 filed on Sep. 10, 2015, the entire contents of which are hereby incorporated by reference.

BACKGROUND OF THE DISCLOSURE

1. Field of the Disclosure

This disclosure relates to a vehicle driving control device and a control device.

2. Description of the Related Art

A vehicle driving control device that controls the speed of a vehicle on the basis of the shape (road curvature or curve radius) of a drive road in front of the vehicle is described in Japanese Patent Application Publication No. 2003-48450 (JP 2003-48450 A). This device calculates a target speed at which the vehicle can drive without deviating from a drive lane on a curve in front of the vehicle, and performs deceleration control such that the speed of the vehicle coincides with the target speed on the curve in front of the vehicle, in a case where the current speed of the vehicle exceeds the target speed.

The device described in JP 2003-48450 A performs the same deceleration control irrespective of distinction between lanes for the vehicle, in a case where the speed of the vehicle exceeds the target speed. Meanwhile, it is considered that a driver driving on an overtaking lane intends to drive at a higher speed than that in other lanes. For this reason, in the present technical field, there is desired a vehicle speed control device that can make the vehicle drive at a higher speed than that when the vehicle is not driving on the overtaking lane when the vehicle drives on the overtaking lane in a case where the vehicle is decelerated according to the curve in front of the vehicle.

SUMMARY

A vehicle driving control device related to a first aspect of the disclosure includes a curve radius acquisition unit configured to acquire a radius of a curve of a drive road in front of a vehicle; a target lateral acceleration setting unit configured to set a target lateral acceleration on the curve on the basis of the radius; a target speed calculation unit configured to calculate a target speed on the curve on the basis of the target lateral acceleration and the radius; a speed acquisition unit configured to acquire the speed of the vehicle; a speed control unit configured to control the speed of the vehicle on the curve on the basis of the target speed and the speed of the vehicle; an image information acquisition unit configured to acquire image information obtained by imaging the surroundings of the vehicle; and a lane determination unit configured to determine whether or not a lane on which the vehicle is driving is an overtaking lane in one-way multiple lanes in the drive road on the basis of the image information. The target lateral acceleration setting unit sets the target lateral acceleration on the curve to be higher than the target lateral acceleration on the curve when it is determined that the lane on which the vehicle is driving is not the overtaking lane in a case where it is determined that the lane on which the vehicle is driving is the overtaking lane. The speed control unit performs the speed control of reducing the speed of the vehicle in accordance with the target speed, in a case where the speed of the vehicle is greater than the target speed.

In this vehicle driving control device, in a case where the lane determination unit determines that the lane on which the vehicle is driving is the overtaking lane, the target lateral acceleration setting unit sets the target lateral acceleration on the curve to be higher than the target lateral acceleration on the curve when the lane determination unit determines that the lane on which the vehicle V is driving is not the overtaking lane. For this reason, when the vehicle drives on the overtaking lane, this device can calculate the target speed to be higher than that in a case where the vehicle drives on other lanes. Therefore, when the vehicle drives on the overtaking lane in a case where the vehicle is decelerated according to the curve in front of the vehicle, this device can make the vehicle drive at a higher speed than that when the vehicle is not driving on the overtaking lane.

The vehicle driving control device may further include a lane information determination unit configured to determine whether or not the lane on which the vehicle is driving is an outside lane of the curve or an inside lane of the curve in one-way multiple lanes on the basis of the image information, and the target lateral acceleration setting unit may set the target lateral acceleration on the curve to be higher than the target lateral acceleration on the curve when the lane information determination unit determines that the lane on which the vehicle is driving is the outside lane of the curve, in a case where the lane determination unit determines that the lane on which the vehicle is driving is the overtaking lane and the lane information determination unit determines that the lane on which the vehicle is driving is the inside lane of the curve.

According to this vehicle driving control device, when the lane determination unit determines that the lane on which the vehicle is driving is the overtaking lane, the target speed when the vehicle drives on the inside lane of the curve can be calculated to be higher than the target speed when the vehicle drives on the outside lane of the curve. There is a tendency in which a driver allows the vehicle to drive at a higher speed than that in the outside lane of the curve because a greater space outside the vehicle than that in the outside lane of the curve is secured, when the vehicle is driving on the inside lane of the curve in one-way multiple lanes, for example, even in a case where the vehicle is decelerated in accordance with the target speed calculated according to the curve in front of the vehicle. That is, this device can make the vehicle drive at a higher speed than that in the outside lane of the curve, when the vehicle is driving on the inside lane of the curve, in a case where the vehicle is decelerated according to the curve in front of the vehicle in consideration of such a driver's tendency.

A control device related to a second aspect of the disclosure includes an actuator that executes driving control of a vehicle; and an electronic controller configured to execute acquiring a radius of a curve of a drive road in front of the vehicle, setting a target lateral acceleration on the curve on the basis of the radius, calculating a target speed on the curve on the basis of the target lateral acceleration and the radius, acquiring the speed of the vehicle, controlling the speed of the vehicle on the curve on the basis of the target speed and the speed of the vehicle, acquiring image information obtained by imaging the surroundings of the vehicle, and determining whether or not a lane on which the vehicle is driving is an overtaking lane in the drive road on the basis of the image information. The electronic controller sets the target lateral acceleration in a case where it is determined that the lane on which the vehicle is driving is the overtaking lane to be higher than the target lateral acceleration in a case where it is determined that the lane on which the vehicle is driving is not the overtaking lane. In a case where the speed of the vehicle is greater than the target speed, the electronic controller transmits a control signal to the actuator so as to perform the speed control of reducing the speed of the vehicle in accordance with the target speed.

In the above control device, in a case where it is determined that the lane on which the vehicle is driving is the overtaking lane, the target lateral acceleration setting unit sets the target lateral acceleration on the curve to be higher than the target lateral acceleration on the curve when it is determined that the lane on which the vehicle V is driving is not the overtaking lane. For this reason, when the vehicle drives on the overtaking lane, the target speed is calculated to be higher than that in a case where the vehicle drives on other lanes. Therefore, when the vehicle drives on the overtaking lane in a case where the vehicle is decelerated according to the curve in front of the vehicle, the vehicle can be made to drive at a higher speed than that when the vehicle is not driving on the overtaking lane.

According to the above aspect, when the vehicle is driving on the overtaking lane in a case where the vehicle is decelerated according to the curve in front of the vehicle, the vehicle can be made to drive at a higher speed than that when the vehicle is not driving on the overtaking lane.

BRIEF DESCRIPTION OF THE DRAWINGS

Features and advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings. In addition, in the following description, the same or equivalent elements will be designated by the same reference signs, and the overlapping description thereof will be omitted.

First Embodiment

Figure 1:
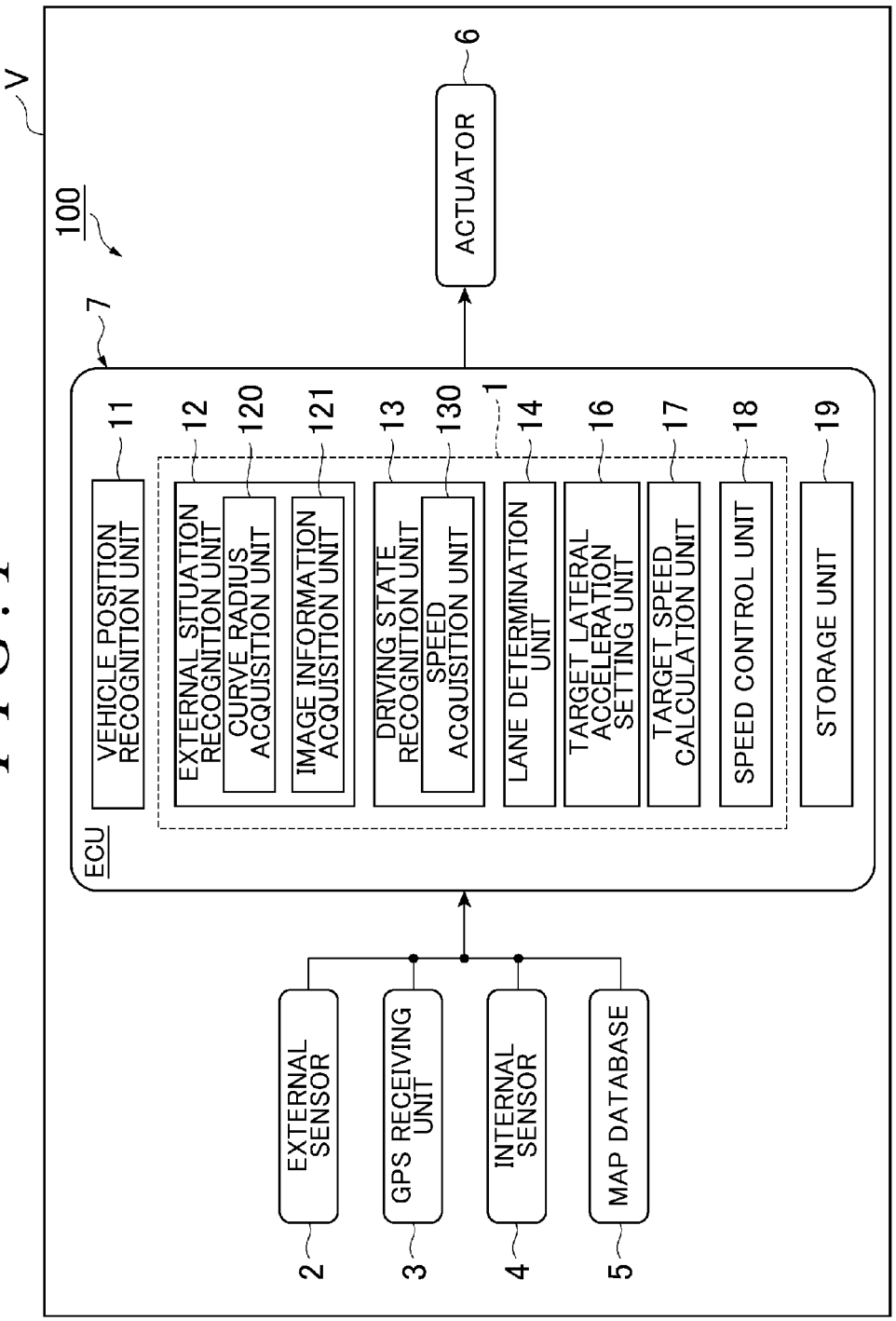
FIG. 1 is a block diagram illustrating the configuration of a vehicle including a vehicle driving control device according to a first embodiment.

FIG. 1 is a block diagram illustrating the configuration of a vehicle V including a vehicle driving control device 1 according to a first embodiment. As illustrated in FIG. 1, the vehicle V, such as a passenger car, is loaded with a vehicle control system 100. The vehicle control system 100 includes the vehicle driving control device 1. The vehicle driving control device 1 is a device that controls the speed of the vehicle V, and is a device that changes or maintains the speed of the vehicle V on the basis of a target speed. The vehicle driving control device 1 sets the target speed according to road environment in front of the vehicle V. The details of road environment will be described below. The vehicle driving control device 1 set the target speed in a range that does not exceed a speed that is set in advance by a driver or a speed that is determined according to law. Also, the vehicle driving control device 1 automatically adjusts the speed of the vehicle V such that the speed of the vehicle V reaches the target speed.

The vehicle control system 100 includes an external sensor 2, a global positioning system (GPS) receiving unit 3, an internal sensor 4, a map database 5, an actuator 6, and an ECU 7.

The external sensor 2 detects external situations that are peripheral information of the vehicle V. The external sensor 2 includes a camera. As an example, the camera is provided on a back side of a windshield of the vehicle V. The camera is an imaging device that images the external situations of the vehicle V. The camera outputs image information on the external situations of the vehicle V to the ECU 7. The image information is information obtained by converting light signals in a predetermined image format.

The GPS receiving unit 3 receives signals from three or more GPS satellites, and acquires positional information showing the position of the vehicle V. Latitude and longitude are included in the positional information. The GPS receiving unit 3 outputs the measured positional information of the vehicle V to the ECU 7.

The internal sensor 4 detects information according to the driving state of the vehicle V. The internal sensor 4 includes a speed sensor in order to detect the information according to the driving state of the vehicle V. The speed sensor is a detector that detects the speed of the vehicle V. As an example of the speed sensor, a vehicle wheel speed sensor that is provided at a wheel of the vehicle V or a drive shaft that rotates integrally with the wheel, or the like and detects the rotating speed of the wheel is used. The speed sensor outputs speed information (vehicle wheel speed information) including the speed of the vehicle V to the ECU 7.

The map database 5 is a database including map information. The map database 5 is formed within a hard disk drive (HDD) loaded on the vehicle V. Information on road environment is included in the map information. Positional information on roads, information of road shape, positional information of intersections and branch points, the number of lanes, or the types of lanes (a drive lane, an overtaking lane, and the like), and the like are included in the information on road environment. The information of road shape is associated with the map database 5 for respective predetermined road sections. Curve radii are included in the information of road shape. The curve radii are values determined on the basis of the shape drawn by a centerline connecting central positions of a lane together in its width direction, and is calculated for respective lanes. The lanes approaches straight lines as the curve radii are greater. The map database 5 is set such that the ECU 7 can refer to this map database.

The actuator 6 is a device that executes driving control of the vehicle V. The actuator 6 includes a throttle actuator and a brake actuator. The throttle actuator controls the amount of supply (throttle opening degree) of air to an engine according to a control signal from the ECU 7, and controls the driving force of the vehicle V. The brake actuator controls a brake system according to a control signal from the ECU 7, and controls a braking force to be applied to a wheel of the vehicle V. A hydraulic brake system can be used as the brake system.

The ECU 7 is an electronic control unit having a central processing unit (CPU), a read-only memory (ROM), a random access memory (RAM), a controller area network (CAN) communication circuit, and the like. The ECU 7 is connected to a network that performs communication using the CAN communication circuit, and is communicably connected to the above-described constituent elements of the vehicle V. The ECU 7 realizes the functions of constituent elements of the ECU 7 to be described below, by actuating the CAN communication circuit to output and input data, on the basis of a signal output from the CPU, storing the input data in the RAM, loading a program stored in the ROM into the RAM, and executing the program loaded into the RAM. In addition, the ECU 7 may be constituted of a plurality of electronic control units.

The ECU 7 includes a vehicle position recognition unit 11, an external situation recognition unit 12, a driving state recognition unit 13, a lane determination unit 14, a target lateral acceleration setting unit 16, a target speed calculation unit 17, a speed control unit 18, and a storage unit 19. As an example, the vehicle driving control device 1 is configured to include the external situation recognition unit 12, the driving state recognition unit 13, the lane determination unit 14, the target lateral acceleration setting unit 16, the target speed calculation unit 17, and the speed control unit 18.

The vehicle position recognition unit 11 recognizes the vehicle position of the vehicle V on a map, on the basis of the positional information of the vehicle V received by the GPS receiving unit 3, and the map information of the map database 5.

The external situation recognition unit 12 acquires the peripheral information of the vehicle V. The peripheral information is information showing environment or a situation within a predetermined range of the vehicle V. The external situation recognition unit 12 includes a curve radius acquisition unit 120 and an image information acquisition unit 121.

The curve radius acquisition unit 120 acquires the curve radius of a curve of a drive road in front of the vehicle V. The drive road is a road on which the vehicle V is able to drive, and is an exclusive vehicle road, a local street, or the like. The drive road in front of the vehicle V is a drive road within a predetermined distance range in a driving direction of the vehicle V (or within a predetermined road section) with the vehicle V as a reference. The curve of the drive road is a road section where the curve radius is equal to or less than a predetermined threshold value. The curve radius acquisition unit 120 specifies a drive road in front of the vehicle V and acquires the curve radius of the drive road, on the basis of the positional information of the vehicle V received by the GPS receiving unit 3, and the map information of the map database 5. Next, the curve radius acquisition unit 120 specifies a curve of the drive road on the basis of the curve radius. Then, the curve radius acquisition unit 120 acquires a curve radius corresponding to the specified curve of the drive road from the map database 5.

Figure 2:
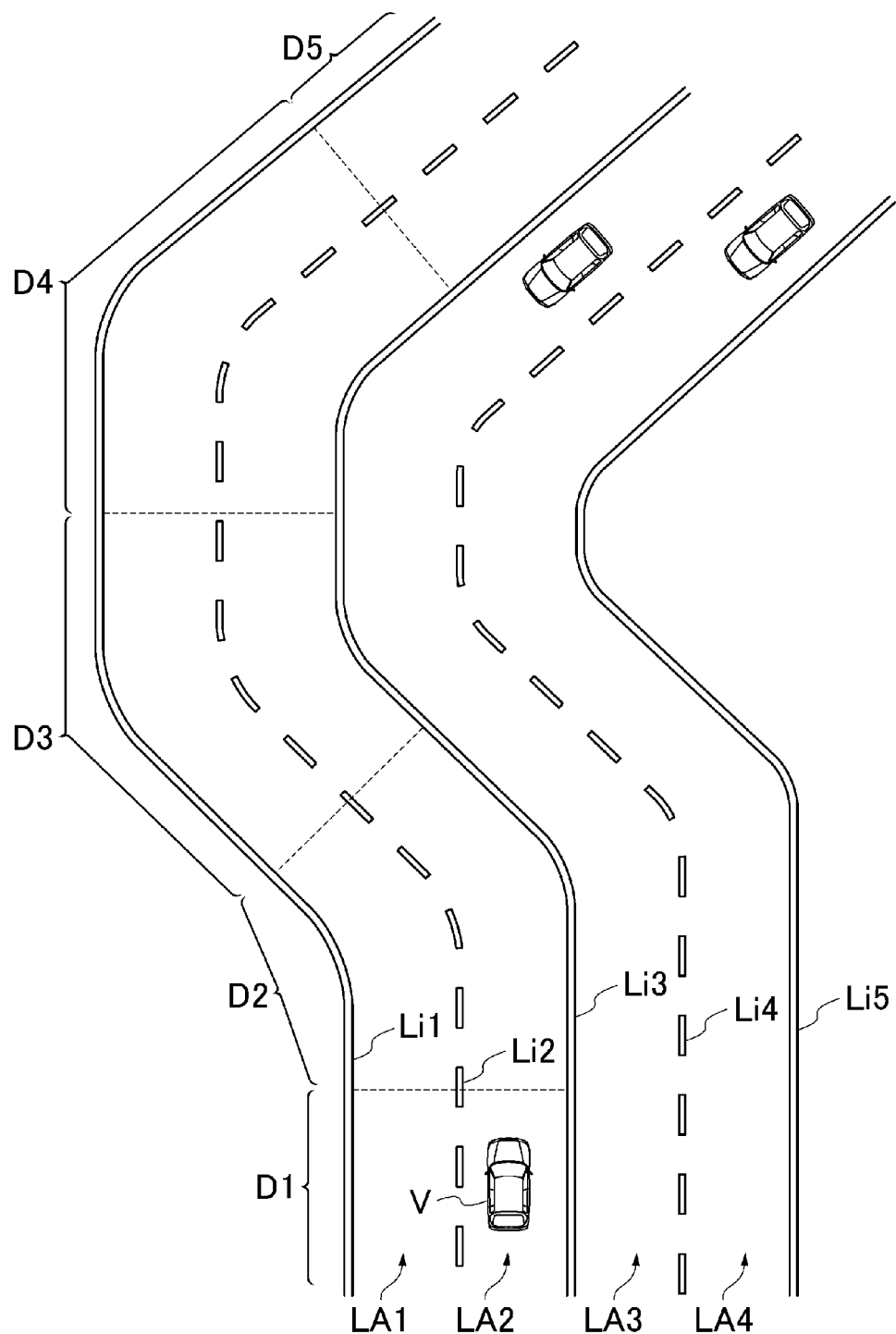
FIG. 2 is an example of a driving environment around the vehicle illustrated in FIG. 1.

Hereinafter, the details of the curve radii of the drive road will be described. FIG. 2 illustrates an example of a driving environment around the vehicle V illustrated in FIG. 1. As illustrated in FIG. 2, the vehicle V is driving on a road of one-way double lanes. The drive road includes a first lane LA1, a second lane LA2, a third lane LA3, and a fourth lane LA4 sequentially from the left. The first lane LA1 is demarcated by a first lane boundary layer Li1 and a second lane boundary layer Li2. The second lane LA2 is demarcated by the second lane boundary layer Li2 and a third lane boundary layer (centerline) Li3. The third lane LA3 is demarcated by the third lane boundary layer Li3 and a fourth lane boundary layer Li4. The fourth lane LA4 is demarcated by the fourth lane boundary layer Li4 and the fifth lane boundary layer (centerline) Li5. The vehicle V is driving on the second lane LA2.

The drive road in front of the vehicle V is divided into predetermined road sections in advance. As illustrated in FIG. 2, the drive road is divided into sections of straight lines and sections of curves. In FIG. 2, the drive road is divided into a first road section D1, a second road section D2, a third road section D3, a fourth road section D4, and a fifth road section D5, and the first road section D1 and the fifth road section D5 are linear sections, and the second road section D2, the third road section D3, and the fourth road section D4 are curves. Curve radii are respectively associated with the road sections in one-to-one correspondence. This association is included in the map information of the map database 5.

The curve radius acquisition unit 120 specifies that a road section in front of the vehicle V is any of the first road section D1 to the fifth road section D5, on the basis of the positional information of the vehicle V acquired by the vehicle position recognition unit 11 and the map information of the map database 5. Then, the curve radius acquisition unit 120 acquires each curve radius on the basis of the map information of the map database 5. Then, the curve radius acquisition unit 120 recognizes a road section where the curve radius is equal to or less than the predetermined threshold value, as a curve. Here, it is supposed that the curve radii of the second road section D2, the third road section D3, and the fourth road section D4 are equal to or less than the predetermined threshold value. In this case, the curve radius acquisition unit 120 recognizes the second road section D2, the third road section D3, and the fourth road section D4 as curves, and acquires the curve radii of these sections as the curve radii of the curves of the drive road in front of the vehicle V.

The image information acquisition unit 121 acquires image information obtained by imaging the surroundings of the vehicle V. The image information obtained by imaging the surroundings of the vehicle V is the information of an image including a lane on which the vehicle V is driving, and the overall drive road in front of the vehicle V. The image information acquisition unit 121 acquires image information from a camera that is the external sensor 2.

The driving state recognition unit 13 recognizes the driving state of the vehicle V on the basis of a detection result of the internal sensor 4. The driving state is the behavior of the vehicle V and is a value detected by the internal sensor 4. The driving state recognition unit 13 includes a speed acquisition unit 130 that acquires the speed of the vehicle V. The speed acquisition unit 130 acquires the speed information of the speed sensor that is the internal sensor 4.

The lane determination unit 14 determines whether or not the lane on which the vehicle V is driving is the overtaking lane in one-way multiple lanes, on the basis of the image information acquired by the image information acquisition unit 121. A road of the one-way multiple lanes is a road where two or more lanes where the driving directions of vehicles become the same direction are present. The overtaking lane is a lane for overtaking. The overtaking means, in a case where a vehicle has kept up with another vehicle, the vehicle changes to another lane, passes by a side of the other vehicle that has been kept up with, and comes out in front of the other vehicle. The overtaking lane is determined according to law or the like. The overtaking lane is generally a leftmost lane among the one-way multiple lanes in the case of left-hand traffic, and a rightmost lane among the one-way multiple lanes in the case of right-hand traffic. Lanes other than the overtaking lane among the one-way multiple lanes are drive lanes. A rule (for example, a lane located on the leftmost side among the one-way multiple lanes is the overtaking lane) for discriminating the overtaking lane is stored in advance in the storage unit 19 of the ECU 7. In addition, depending on law, the overtaking lane and the drive lanes may be distinguished from each other according to the line types of the lane boundary lines. In this case, relationships between the overtaking lane and the line types of the lane boundary lines are stored in advance in the storage unit 19 of the ECU 7.

The lane determination unit 14 determines whether or not the road on which the vehicle V is driving is the road of the one-way multiple lanes, on the basis of the image information. First, the lane determination unit 14 recognizes the centerline (for example, the third lane boundary layer Li3 of FIG. 2) showing a boundary with the opposite lane. For the recognition, well-known image processing techniques, such as edge processing and pattern matching processing, are used. Next, the lane determination unit 14 recognizes lane boundary lines (for example, the first lane boundary layer Li1 and the second lane boundary layer Li2 of FIG. 2) of a road surface on a side where the vehicle V is located with the centerline as a reference. Then, the lane determination unit 14 determines that the road on which the vehicle V is driving is the road of the one-way multiple lanes, in a case where a plurality of lanes demarcated by the lane boundary lines are present on the side where the vehicle V is located with the centerline as a reference. Then, the lane determination unit 14 determines which lane of the one-way multiple lanes is the lane on which the vehicle V is driving. Then, the lane determination unit 14 acquires the rule for discriminating the overtaking lane with reference to the storage unit 19 provided in the ECU 7. Then, the lane determination unit 14 determines whether or not the lane on which the vehicle V is driving is the overtaking lane in the light of the acquired rule.

Otherwise, the lane determination unit 14 may refer to the storage unit 19 of the ECU 7 that stores the relationships between the overtaking lane and the line types of the lane boundary lines, and may determine whether or not the lane on which the vehicle V is driving is the overtaking lane in the one-way multiple lanes, on the basis of the line types of the lane boundary lines of the lane on which the vehicle V is driving, which is recognized using the image information. In this case, the image information in which the surroundings of the vehicle V is imaged by the image information acquisition unit 121 just has to be image information in which lane boundary lines that are boundaries of the lane on which the vehicle V is driving are included in an image.

The target lateral acceleration setting unit 16 sets a target lateral acceleration on the curve, on the basis of the curve radius acquired by the curve radius acquisition unit 120. The target lateral acceleration setting unit 16 sets the target lateral acceleration to a smaller value as the curve radius is greater. The target lateral acceleration setting unit 16 sets the target lateral acceleration to a greater value as the curve radius is smaller.

Figure 3:
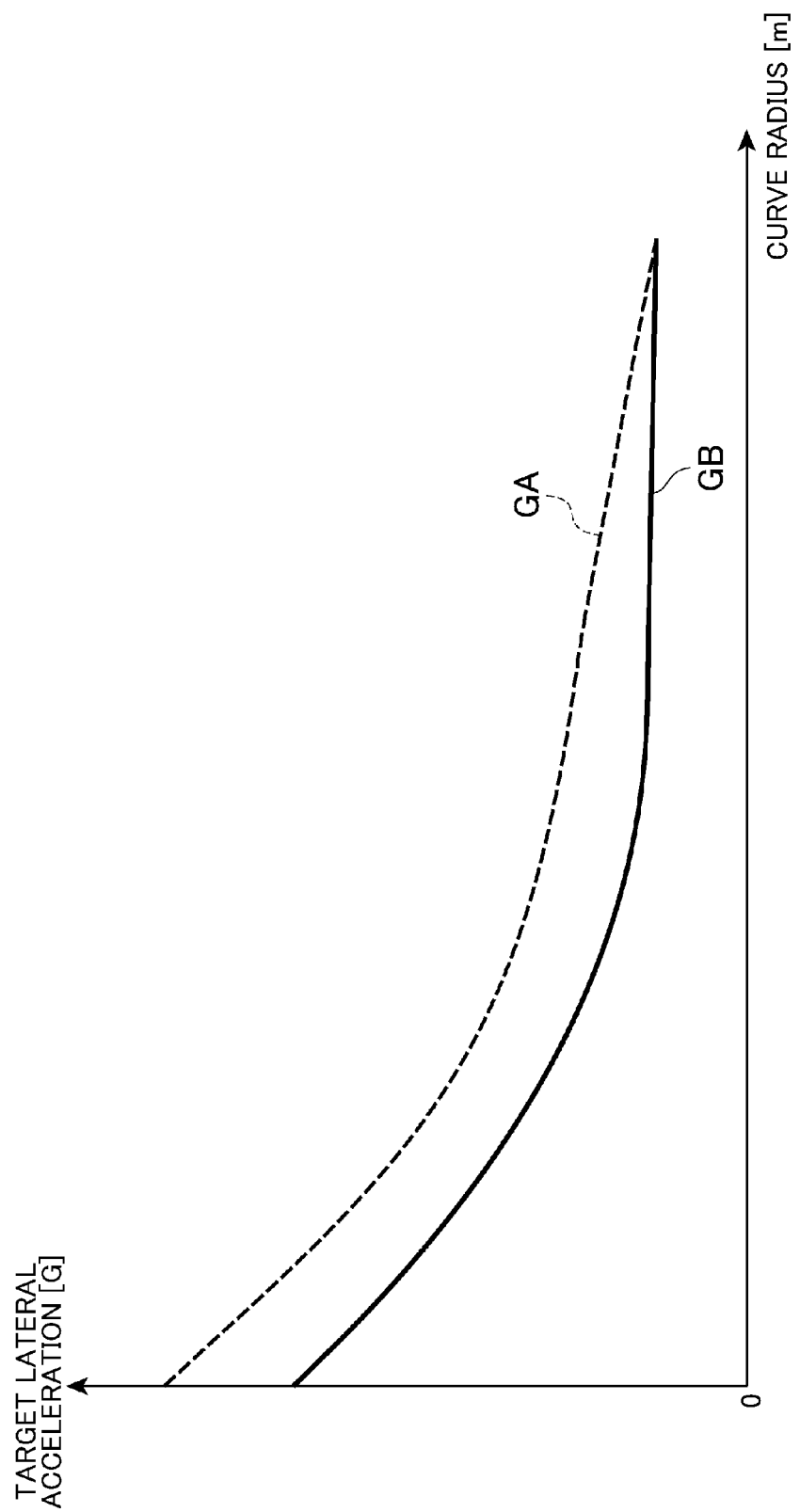
FIG. 3 is an example of target lateral acceleration maps (graphs) illustrating relationships between target lateral accelerations and curve radii.

Target lateral acceleration maps (graphs) showing the above relationships between target lateral accelerations and curve radii are stored in advance in the storage unit 19 provided in the ECU 7. FIG. 3 is an example of target lateral acceleration maps (graphs) illustrating relationships between target lateral accelerations and curve radii. As illustrated in a first graph GA or a second graph GB of FIG. 3, a relationship in which a target lateral acceleration becomes smaller as a curve radius is greater is provided. The target lateral acceleration setting unit 16 refers the storage unit 19 provided in the ECU 7, and sets a target lateral acceleration on a curve on the basis of the curve radius acquired by the curve radius acquisition unit 120 and the target lateral acceleration map referred to.

Moreover, the target lateral acceleration setting unit 16 selects a target lateral acceleration map according to the type of a lane (the overtaking lane or a drive lane). The first graph GA is a target lateral acceleration map for an overtaking lane, and the second graph GB is a target lateral acceleration map for a drive lane. The first graph GA is set so as to become greater than the second graph GB if these graphs are compared with each other in the same curve radius. In addition, as a curve radius approaches ∞ (that is, as a road shape is a road shape close to a linear section), a target lateral acceleration determined by the first graph GA approaches a target lateral acceleration determined by the second graph GB. In addition, when a curve radius is ∞, that is, when a road shape is a linear section, a target lateral acceleration determined by the first graph GA coincides with a target lateral acceleration determined by the second graph GB. The target lateral acceleration map for an overtaking lane and the target lateral acceleration map for a drive lane that satisfy such relationships are stored in advance in the storage unit 19 provided in the ECU 7.

The target lateral acceleration setting unit 16 refers to the storage unit 19 provided in the ECU 7 and selects the target lateral acceleration map for an overtaking lane (first graph GA), in the case where the lane determination unit 14 determines that the lane on which the vehicle V is driving is the overtaking lane. Meanwhile, the target lateral acceleration setting unit 16 selects the target lateral acceleration map for a drive lane (second graph GB) with reference to the storage unit 19 with that the ECU 7 is equipped, in a case where the lane determination unit 14 determines that the lane on which the vehicle V is driving is a drive lane (a lane other than the overtaking lane). Then, the target lateral acceleration setting unit 16 sets a target lateral acceleration on a curve, on the basis of the curve radius acquired by the curve radius acquisition unit 120 and the target lateral acceleration map referred to. As described above, the first graph GA is set to be greater than the second graph GB. For this reason, in a case where the lane determination unit 14 determines that the lane on which the vehicle V is driving is the overtaking lane, the target lateral acceleration setting unit 16 sets the target lateral acceleration on the curve to be higher than the target lateral acceleration on the curve when the lane determination unit 14 determines that the lane on which the vehicle V is driving is not the overtaking lane. That is, the target lateral acceleration setting unit 16 sets the target lateral acceleration to be higher than that in a case where it is assumed that the lane on which the vehicle V is driving is the drive lane, in a case where the lane on which the vehicle V is driving is the overtaking lane.

The target speed calculation unit 17 calculates a target speed on the curve on the basis of the target lateral acceleration set by the target lateral acceleration setting unit 16 and the curve radius acquired by the curve radius acquisition unit 120. The target speed can be calculated by substituting the curve radius and the target lateral acceleration in a general equation of vehicle motion. In the general equation of vehicle motion, the target speed has a relationship proportional to the target lateral acceleration and the curve radius.

Figure 4:
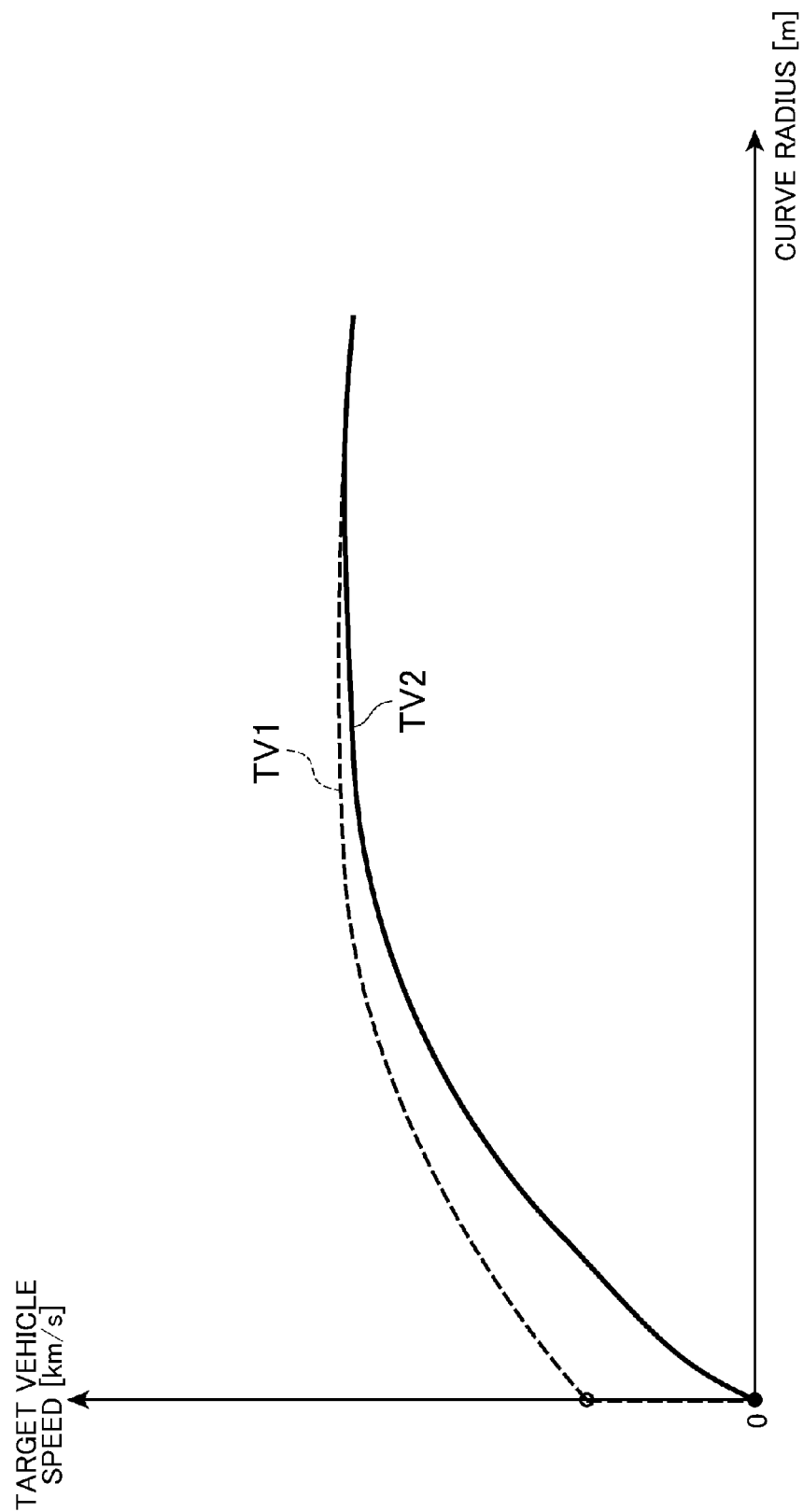
FIG. 4 is an example of graphs illustrating relationships between calculation results of target speeds, and curve radii.

FIG. 4 is an example of graphs illustrating relationships between calculation results of target speeds, and curve radii. A first target speed graph TV1 shows a relationship between target speeds and curve radii in the overtaking lane. The first target speed graph TV1 is a graph obtained by plotting target speeds, which are calculated using the target lateral acceleration map (first graph GA) for an overtaking lane of FIG. 3, for respective curve radius. The second target speed graph TV2 shows a relationship between target speeds and curve radii in a drive lane. That is, the second target speed graph TV2 is a graph obtained by plotting target speeds, which are calculated using the target lateral acceleration map (second graph GB) for a drive lane of FIG. 3, for respective curve radii. As illustrated in FIG. 4, the target speed calculation unit 17 calculates a higher target speed than that in a case where the lane on which the vehicle V is driving is not the overtaking lane, in a case where the lane on which the vehicle V is driving is the overtaking lane.

In addition, the target speed calculation unit 17 sets a target speed in a range that does not exceed a speed that is set in advance by a driver or a speed that is determined according to law. That is, in a case where the a target speed calculated using the target lateral acceleration map exceeds a speed that is set in advance by a driver or a speed that is determined according to law, the target speed calculation unit 17 sets the speed that is set in advance by a driver or the speed that is determined according to law, to the target speed.

The speed control unit 18 controls the speed of the vehicle V on the basis of the target speed and the speed of the vehicle V. The speed control unit 18 performs the speed control of reducing the speed of the vehicle V in accordance with the target speed, in a case where the speed of the vehicle V is greater than the target speed. The speed control unit 18 outputs a control signal to the actuator 6, and controls to decelerate the vehicle V. The speed control unit 18 matches the speed of the vehicle V with the target speed until the vehicle V reaches a curve after the target speed is calculated by the target speed calculation unit 17.

Figure 5:
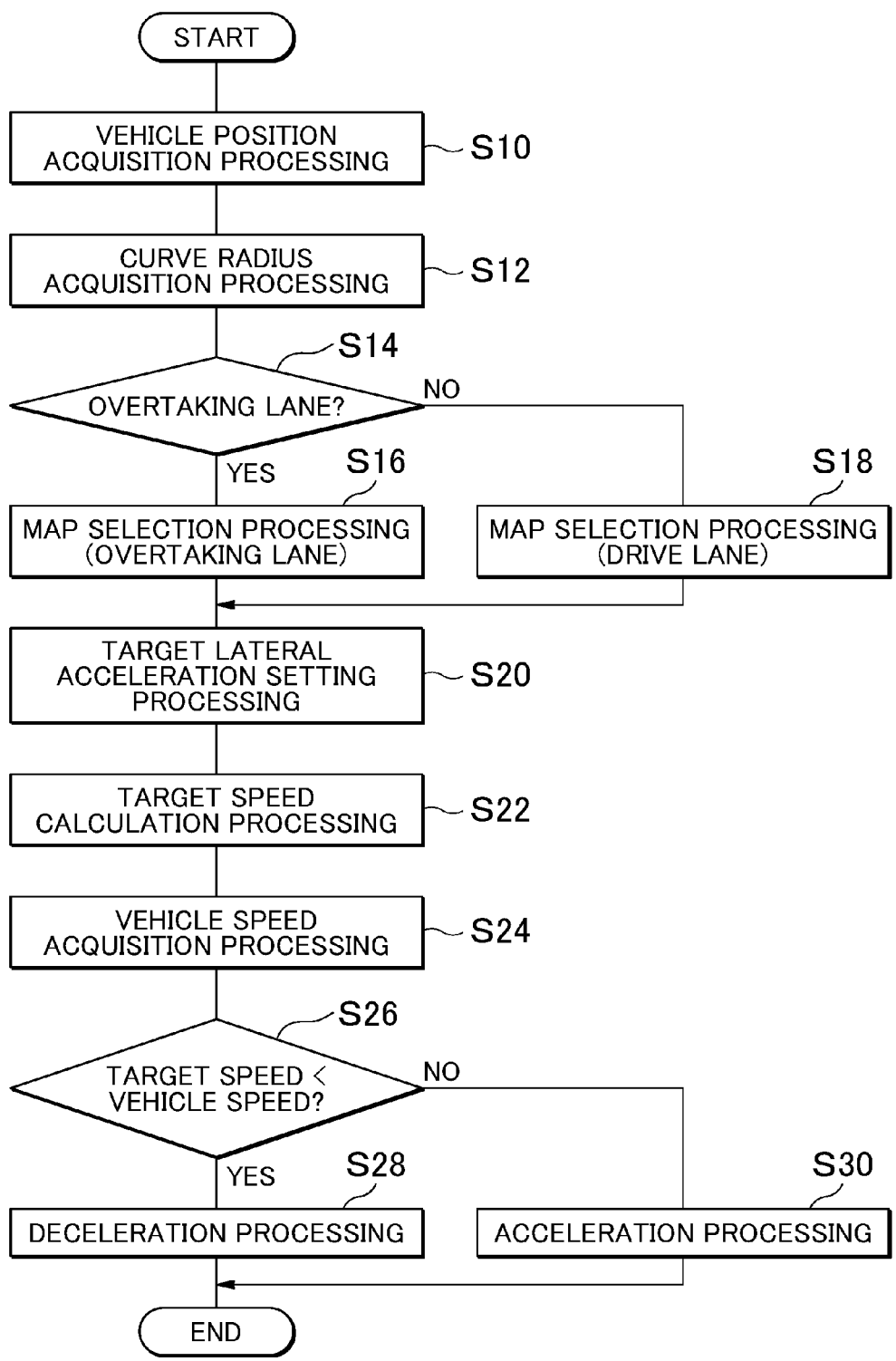
FIG. 5 is a flowchart of driving control processing of a vehicle control system.

Next, driving control processing will be described. FIG. 5 is a flowchart of the driving control processing of the vehicle control system 100. The flowchart illustrated in FIG. 5 is started at a timing such that a speed control ON/OFF switch is turned on, as an example.

As illustrated in FIG. 5, the vehicle position recognition unit 11 acquires the vehicle position of the vehicle V, as vehicle position acquisition processing (S10). The vehicle position recognition unit 11 recognizes the vehicle position of the vehicle V on a map, on the basis of the positional information of the vehicle V received by the GPS receiving unit 3, and the map information of the map database 5.

Next, the curve radius acquisition unit 120 acquires the curve radius of a curve of a drive road in front of the vehicle V, as curve radius acquisition processing (S12). For example, in the driving environment illustrated in FIG. 2, the curve radius acquisition unit 120 specifies that a road section in front of the vehicle V is any of the first road section D1 to the fifth road section D5, on the basis of the positional information of the vehicle V acquired by the vehicle position recognition unit 11 and the map information of the map database 5, and acquires each curve radius on the basis of the map information of the map database 5. Then, the curve radius acquisition unit 120 specifies a road section where the curve radius is equal to or less than the predetermined threshold value, as a curve. Then, the curve radius acquisition unit 120 acquires the curve radius of the curve.

Next, the lane determination unit 14 determines whether or not the lane on which the vehicle V is driving is the overtaking lane in one-way multiple lanes, on the basis of the image information acquired by the image information acquisition unit 121, as lane determination processing (S14). For example, in the driving environment illustrated in FIG. 2, the lane determination unit 14 recognizes that the lane on which the vehicle V drives is demarcated by the second lane boundary layer Li2 and the third lane boundary layer Li3 on the basis of the image information. Then, the lane determination unit 14 determines whether or not the lane on which the vehicle V is driving is the overtaking lane in the one-way multiple lanes, on the basis of the line types of the second lane boundary layer Li2 and the third lane boundary layer Li3. In a case where it is determined that the lane on which the vehicle V is driving is the overtaking lane in the one-way multiple lanes on the lane determination processing (S14), the processing proceeds to map selection processing (S16).

The target lateral acceleration setting unit 16 selects the target lateral acceleration map for an overtaking lane, as map selection processing (S16). The target lateral acceleration setting unit 16 refers to the storage unit 19 provided in the ECU 7 and selects the target lateral acceleration map for an overtaking lane (for example, the first graph GA of FIG. 3). A target lateral acceleration in the same curve radius in the target lateral acceleration map for an overtaking lane is set to be greater than that in the target lateral acceleration map for a drive lane. If the map selection processing (S16) is completed, the processing proceeds to target lateral acceleration setting processing (S20).

On the other hand, in a case where it is not determined that the lane on which the vehicle V is driving is the overtaking lane in the one-way multiple lanes on the lane determination processing (S14), the processing proceeds to map selection processing (S18).

The target lateral acceleration setting unit 16 selects the target lateral acceleration map for an overtaking lane, as map selection processing (S18). The target lateral acceleration setting unit 16 refers to the storage unit 19 provided in the ECU 7 and selects the target lateral acceleration map for a drive lane (for example, the second graph GB of FIG. 3). A target lateral acceleration in the same curve radius in the target lateral acceleration map for a drive lane is set to be smaller than that in the target lateral acceleration map for an overtaking lane. If the map selection processing (S18) is completed, the processing proceeds to the target lateral acceleration setting processing (S20).

The target lateral acceleration setting unit 16 sets a target lateral acceleration, on the basis of the curve radius acquired on the curve radius acquisition processing (S12) and the target lateral acceleration map selected in the selection processing (S16 or S18), as target lateral acceleration setting processing (S20). If the target lateral acceleration setting processing (S20) is completed, the processing proceeds to target speed calculation processing (S22).

The target speed calculation unit 17 calculates a target speed, on the basis of the target lateral acceleration set in the target lateral acceleration setting processing (S20) and the curve radius acquired on the curve radius acquisition processing (S12), as target speed calculation processing (S22). The target speed calculation unit 17 calculates the target speed by substituting the target lateral acceleration and the curve radius in the general equation of motion. Accordingly, for example, as illustrated in FIG. 4, a target speed (first target speed graph TV1) in a case where the vehicle V drives on the overtaking lane become greater value than a target speed (the second target speed graph TV2) in a case where the vehicle V drives on a drive lane, in the same curve radius. If the target speed calculation processing (S22) is completed, the processing proceeds to vehicle speed acquisition processing (S24).

The speed acquisition unit 130 acquires the speed of the vehicle V from a speed sensor that is the internal sensor 4, as vehicle speed acquisition processing (S24). If the vehicle speed acquisition processing (S24) is completed, the processing proceeds to speed determination processing (S26).

The speed control unit 18 determines whether or not the target speed calculated by the target speed calculation processing (S22) is smaller than the speed of the vehicle acquired by the vehicle speed acquisition processing (S24), as the speed determination processing (S26). In a case where it is determines that the target speed is smaller than speed of the vehicle in the speed determination processing (S26), the processing proceeds to deceleration processing (S28).

The speed control unit 18 reduces the speed of the vehicle V so as to match the target speed, on the basis of the target speed and the speed of the vehicle V, as the deceleration processing (S28). The speed control unit 18 outputs a control signal to the actuator 6, and matches the speed of the vehicle V with the target speed until the vehicle V reaches the curve after the target speed is calculated by the target speed calculation unit 17. If the deceleration processing (S28) is completed, the driving control processing illustrated in FIG. 5 is completed.

On the other hand, in a case where it is not determined that the target speed is smaller than the speed of the vehicle in the speed determination processing (S26), the processing proceeds to acceleration processing (S30). The speed control unit 18 increases the speed of the vehicle V so as to match the target speed, on the basis of the target speed and the speed of the vehicle V, as the acceleration processing (S30). The speed control unit 18 outputs a control signal to the actuator 6, and accelerates the vehicle V. In addition, the speed control unit 18 is accelerated in the range that does not exceed the speed that is set in advance by a driver or the speed that is determined according to law. The speed control unit 18 maintains the current speed of the vehicle V, in a case where the speed of the vehicle V is equal to the target speed. If the acceleration processing (S30) is completed, the driving control processing illustrated in FIG. 5 is completed.

In a case where the driving control processing illustrated in FIG. 5 is completed, the processing is again executed in order from S10. That is, the driving control processing illustrated in FIG. 5 is repeatedly executed. In addition, in a case where the speed control ON/OFF switch is turned off, the driving control processing is not repeatedly executed even in a case where the deceleration processing (S28) or the acceleration processing (S30) is completed.

As described above, in the vehicle driving control device 1 according to the first embodiment, when the target lateral acceleration on the curve acquired by the curve radius acquisition unit 120 is set, in a case where the lane determination unit 14 determines that the lane on which the vehicle V is driving is the overtaking lane, the target lateral acceleration on the curve is set to be higher than the target lateral acceleration on the curve when the lane determination unit 14 determines that the lane on which the vehicle V is driving is not the overtaking lane. For this reason, the vehicle driving control device 1 can calculate the target speed to be higher than that in a case where the vehicle V drives on other lanes, when the vehicle V drives the overtaking lane, even in a case where the target speed becomes lower than the current speed of the vehicle V according to the shape of the drive road in front of the vehicle V. Hence, when the vehicle V drives on the overtaking lane in a case where the vehicle V is decelerated according to the shape of the drive road in front of the vehicle V, the vehicle driving control device 1 can make the vehicle V drive at a higher speed than that when the vehicle is not driving on the overtaking lane.

There is a tendency in which a driver is conscious of the vehicle driving at a higher speed than that in a case where the vehicle is driving on another lane, when the vehicle is driving on the overtaking lane in the one-way multiple lanes, even in a case where the vehicle is decelerated so as to have the target speed set according to the shape of the drive road in front of the vehicle V. That is, upper limits or lower limits of target speeds assumed by a driver are different from each other in the overtaking lane and a drive lane. For this reason, if the target speeds are equally set according to a curve shape, there is a concern that drivability may degrade particularly when a vehicle is driving on the overtaking lane. Since the vehicle driving control device 1 according to the first embodiment can calculate the target speeds that are different from each other in the overtaking lane and the drive lane and can calculate the target speed of the overtaking lane to be higher than the target speed of the drive lane, degradation of drivability can be avoided.

Second Embodiment

A vehicle driving control device 1A according to a second embodiment is different from the vehicle driving control device 1 according to the first embodiment in that it is determined whether the lane on which the vehicle V is driving is an outside lane of a curve in one-way multiple lanes or an inside lane of the curve, and a target lateral acceleration is calculated on the basis of the determination result. Specifically, the vehicle driving control device 1A is different from the vehicle driving control device 1 in that a target lateral acceleration setting unit 16A is included instead of the target lateral acceleration setting unit 16, and a lane information determination unit 15 is included. The other configurations of the vehicle driving control device 1A are the same as those of the vehicle driving control device 1. Hereinafter, the description of the same configuration as the vehicle driving control device 1 will be omitted, and differences between the vehicle driving control device 1A and the vehicle driving control device I will mainly be described.

Figure 6:
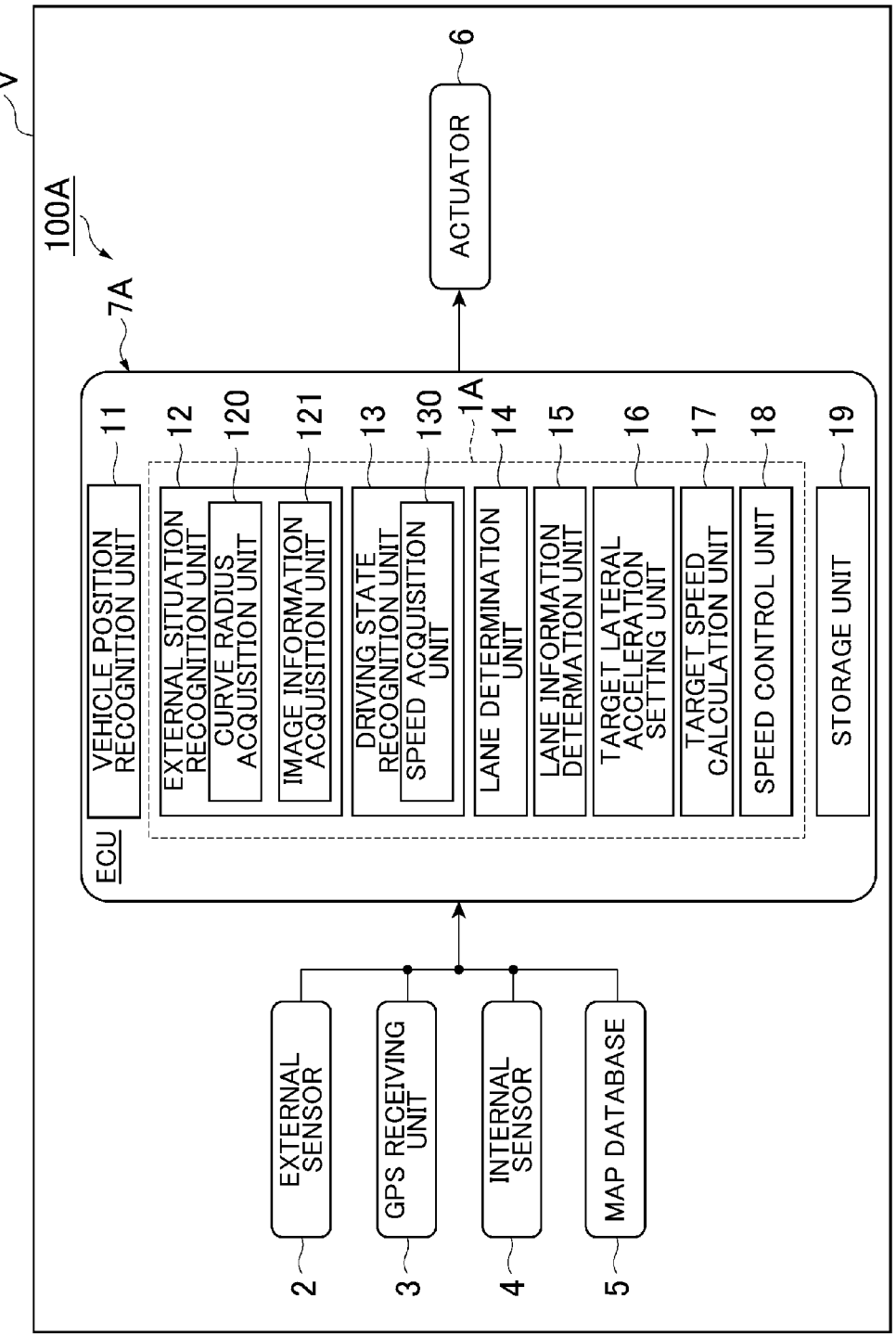
FIG. 6 is a block diagram illustrating the configuration of a vehicle including a vehicle driving control device according to a second embodiment.

FIG. 6 is a block diagram illustrating the configuration of the vehicle V including the vehicle driving control device 1A according to the second embodiment. As illustrated in FIG. 6, the ECU 7A includes the vehicle position recognition unit 11, the external situation recognition unit 12, the driving state recognition unit 13, the lane determination unit 14, the lane information determination unit 15, the target lateral acceleration setting unit 16A, the target speed calculation unit 17, and the speed control unit 18. As an example, the vehicle driving control device 1A is configured to include the external situation recognition unit 12, the driving state recognition unit 13, the lane determination unit 14, the lane information determination unit 15, the target lateral acceleration setting unit 16A, the target speed calculation unit 17, and the speed control unit 18.

The lane information determination unit 15 determines whether or not the lane on which the vehicle V is driving is the outside lane of the curve or the inside lane of the curve in the one-way multiple lanes, on the basis of image information. The image information obtained by imaging the surroundings of the vehicle V is the information of an image including the lane on which the vehicle V is driving, and an overall drive road in front of the vehicle V. The outside lane of the curve in the one-way multiple lanes is a lane that is farthest from a central point that defines a curve radius, among in a road where two or more lanes in which vehicle driving directions become the same direction are present. The inside lane of the curve in the one-way multiple lanes is a lane that is closest to the central point that defines the curve radius, among in the road where the two or more lanes in which the vehicle driving directions become the same direction are present. In a case where the driving environment illustrated in FIG. 2 is used as an example, the second road section D2 is present in front of the vehicle V that is driving on the second lane LA2. The lane information determination unit 15 determines that the second road section D2 is a left curve, on the basis of the image information. The lane information determination unit 15 detects the shape of the first lane boundary layer Li1 of the second road section D2, the shape of the second lane boundary layer Li2 of the second road section D2, or the shape of the third lane boundary layer Li3 of the second road section D2, on the basis of the image information, and determines that the shape is curved in either a leftward direction or in a rightward direction with respect to the vehicle driving direction. The lane information determination unit 15 determines that the shape of the first lane boundary layer Li1 of the second road section D2 is curved in the leftward direction, on the basis of the image information. The third road section D3 to the fifth road section D5 are also determined by the same processing as the determination processing for the second road section D2. The lane information determination unit 15 determines that the shape of the first lane boundary layer Li1 of the third road section D3 is curved in the rightward direction, on the basis of the image information. The lane information determination unit 15 determines that the shape of the first lane boundary layer Li1 of the fourth road section D4 is curved in the rightward direction, on the basis of image information. The lane information determination unit 15 determines that the shape of the first lane boundary layer Li1 of the fifth road section D5 is not curved in any of the leftward and rightward directions (that is, a road section is a linear section), on the basis of the image information.

The lane information determination unit 15 determines whether or not the lane on which the vehicle V is driving is the outside lane of the curve or the inside lane of the curve in the one-way multiple lanes, on the basis of the curving direction of a road shape and the position of the lane on which the vehicle V is driving. Since the shape of the first lane boundary layer Li1 of the second road section D2 is curved in the leftward direction, and the second lane boundary layer Li2 on which the vehicle V drives is a rightmost lane of the one-way multiple lanes, the lane information determination unit 15 determines that the lane on which the vehicle V is driving in the second road section D2 is the outside lane of the curve in the one-way multiple lanes. Additionally, since the shape of the first lane boundary layer Li1 of the third road section D3 is curved in the rightward direction, and the second lane boundary layer Li2 on which the vehicle V drives is the rightmost lane of the one-way multiple lanes, the lane information determination unit 15 determines that the lane on which the vehicle V is driving in the third road section D3 is the inside lane of the curve in the one-way multiple lanes. Additionally, since the shape of the first lane boundary layer Li1 of the fourth road section D4 is curved in the rightward direction, and the second lane boundary layer Li2 on which the vehicle V drives is the rightmost lane of the one-way multiple lanes, the lane information determination unit 15 determines that the lane on which the vehicle V is driving in the fourth road section D4 is the inside lane of the curve in the one-way multiple lanes. Additionally, since the shape of the first lane boundary layer Li1 of the fifth road section D5 is not curved in any of the leftward and rightward directions, the lane information determination unit 15 determines that the lane on which the vehicle V is driving in the fifth road section D5 is not any of the outside lane of the curve or the inside lane of the curve in the one-way multiple lanes.

Moreover, the lane information determination unit 15 may perform final determination by combining a determination result based on the image information and a determination result based on the other information. Hereinafter, an example of determination processing based on the other information will be described. The lane information determination unit 15 determines whether or not the lane on which the vehicle V is driving is one-way multiple lanes, on the basis of the vehicle position recognized by the vehicle position recognition unit 11 and the map information of the map database 5. The lane information determination unit 15 determines whether or not the lane on which the vehicle V is driving is one-way multiple lanes, on the basis of the number of lanes associated with the map information corresponding to the position of the vehicle V, and the positional information of the vehicle V. Then, the lane information determination unit 15 recognizes the lane on which the vehicle V is driving from the multiple lanes, on the basis of the vehicle position of the vehicle V and the map information. Then, the lane information determination unit 15 determines that a road section in front of the vehicle V is curved in any direction of the leftward and rightward directions with respect to the vehicle driving direction, on the basis of the vehicle position recognized by the vehicle position recognition unit 11 and the map information of the map database 5. Accordingly, the lane information determination unit 15 can determine whether or not the lane on which the vehicle V is driving is the outside lane of the curve or the inside lane of the curve in the one-way multiple lanes. In this way, the position of the lane on which the vehicle V is driving may be recognized using the information other than the image information, and whether or not the vehicle V is driving on the outside lane of the curve or the inside lane of the curve may be determined from the recognition result. The lane information determination unit 15 may determine whether or not the lane on which the vehicle V is driving is the outside lane of the curve or the inside lane of the a curve, on the basis of the image information, in a case where it is determined that the lane on which the vehicle V is driving is the outside lane of the curve or the inside lane of the curve on the basis of the other information.

The target lateral acceleration setting unit 16A is different from the target lateral acceleration setting unit 16 in that not only the target lateral acceleration is set in consideration of whether or not the lane on which the vehicle V is driving is the overtaking lane but also, the target lateral acceleration is set in consideration of whether or not the lane on which the vehicle V is driving is the outside lane of the curve or the inside lane of the curve.

Figure 7:
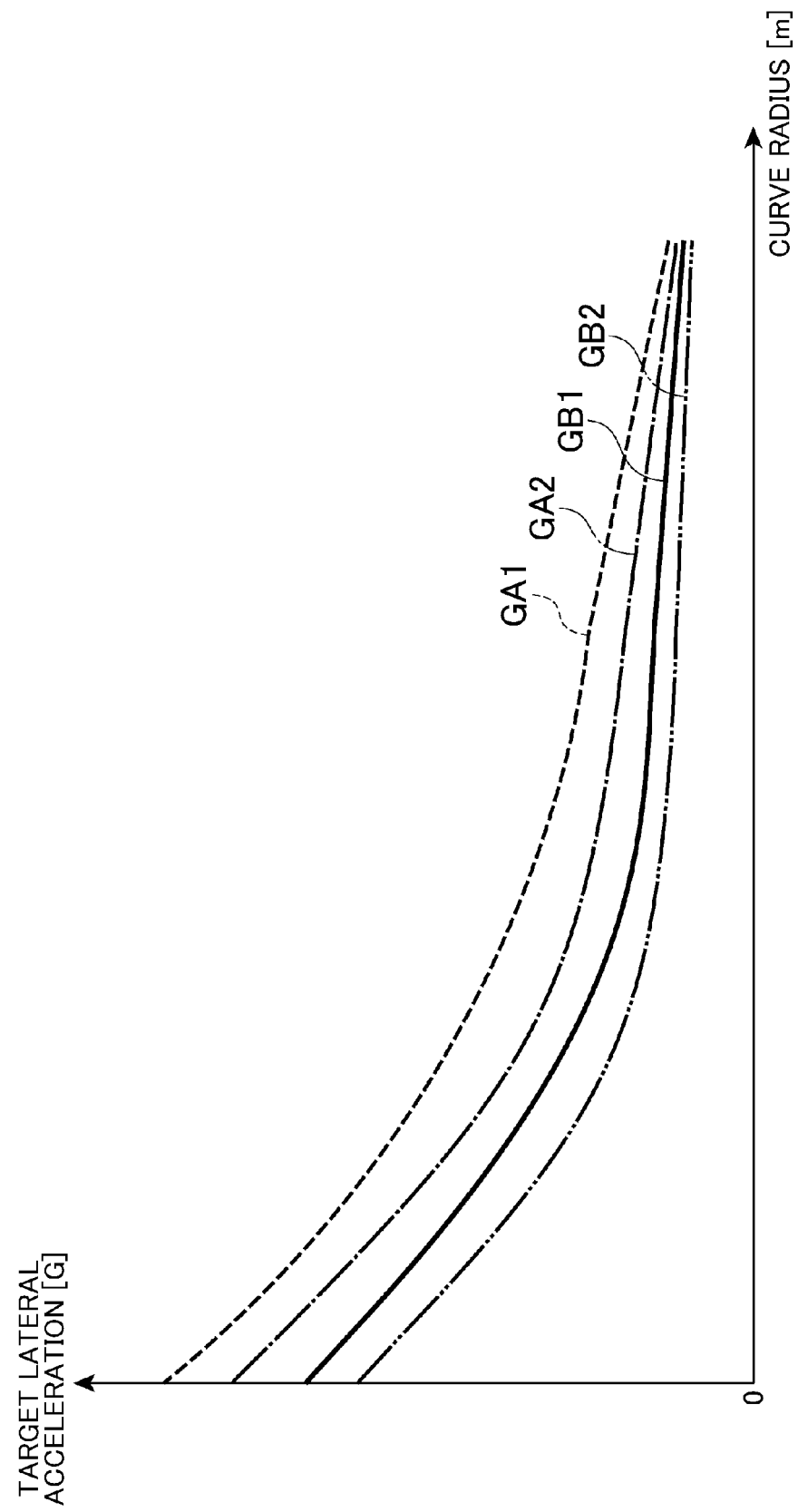
FIG. 7 is another example of target lateral acceleration maps (graphs) illustrating relationships between target lateral accelerations and curve radii.

The target lateral acceleration maps (graphs) that the target lateral acceleration setting unit 16A refers to is classified into four maps for an overtaking lane and an inside lane of a curve, for an overtaking lane and an outside lane of a curve, for a drive lane and an inside lane of a curve, and for a drive lane and an outside lane of a curve. FIG. 7 is an example of target lateral acceleration maps (graphs) illustrating relationships between target lateral accelerations and curve radii. As illustrated in a fifth graph GA1 to an eighth graph GB2 of FIG. 7, a relationship in which a target lateral acceleration becomes smaller as a curve radius is greater is provided. A target lateral acceleration map for an overtaking lane and the inside lane of the curve is the fifth graph GA1. A target lateral acceleration map for an overtaking lane and an outside lane of a curve is the sixth graph GA2. A target lateral acceleration map for a drive lane and an inside lane of a curve is the seventh graph GB 1. A target lateral acceleration map for a drive lane and an outside lane of a curve is the eighth graph GB2. The fifth graph GA1 and the sixth graph GA2 are set to be greater than the seventh graph GB1 and the eighth graph GB2. That is, the target lateral acceleration of the overtaking lane is set to be greater than the target lateral acceleration of the drive lane. Moreover, the fifth graph GA1 is set to be greater than the sixth graph GA2, and the seventh graph GB1 is set to be greater than the eighth graph GB2. That is, the target lateral acceleration of the inside lane of the curve is set to be greater than the target lateral acceleration of the outside lane of the curve. The target lateral acceleration maps that satisfy such relationships are stored in advance in the storage unit 19 provided in the ECU 7.

The target lateral acceleration setting unit 16A refers to the storage unit 19 provided in the ECU 7 and selects the target lateral acceleration map for an overtaking lane (fifth graph GA1), in a case where the lane determination unit 14 determines that a lane on which the vehicle V is driving is an overtaking lane and an inside lane of a curve. The target lateral acceleration setting unit 16A refers to the storage unit 19 provided in the ECU 7 and selects the target lateral acceleration map for an overtaking lane and an outside lane of a curve (sixth graph GA2), in a case where the lane determination unit 14 determines that an lane on which the vehicle V is driving is the overtaking lane and an outside lane of the curve. On the other hand, the target lateral acceleration setting unit 16A refers to the storage unit 19 provided in the ECU 7 and selects the target lateral acceleration map for an overtaking lane and an inside lane of a curve (seventh graph GB1), in a case where the lane determination unit 14 determines that the lane on which the vehicle V is driving is a drive lane and the inside lane of the curve. The target lateral acceleration setting unit 16A refers to the storage unit 19 provided in the ECU 7 and selects the target lateral acceleration map for a drive lane and an outside lane of a curve (eighth graph GB2), in a case where the lane determination unit 14 determines that the lane on which the vehicle V is driving is the drive lane and the outside lane of the curve.

Then, the target lateral acceleration setting unit 16A sets a target lateral acceleration on the curve, on the basis of the curve radius acquired by the curve radius acquisition unit 120 and the target lateral acceleration map referred to. As described above, the target lateral acceleration in the inside lane of the curve in the overtaking lane or the drive lane is set to be greater than that in the outside lane of the curve. For this reason, in a case where the lane determination unit 14 determines that the lane on which the vehicle V is driving is the overtaking lane and the lane information determination unit 15 determines that the lane on which the vehicle V is driving is the inside lane of the curve, the target lateral acceleration setting unit 16A sets the target lateral acceleration on the curve to be higher than the target lateral acceleration on the curve when the lane information determination unit 15 determines that the lane on which the vehicle V is driving is the outside lane of the curve. That is, the target lateral acceleration setting unit 16A sets the target lateral acceleration to be higher than that in a case where it is assumed that the lane on which the vehicle V is driving is the overtaking lane and the outside lane of the curve, in a case where the lane on which the vehicle V is driving is the overtaking lane and the inside lane of the curve.

The other configurations of the vehicle driving control device 1A are the same as those of the vehicle driving control device 1.

Figure 8:
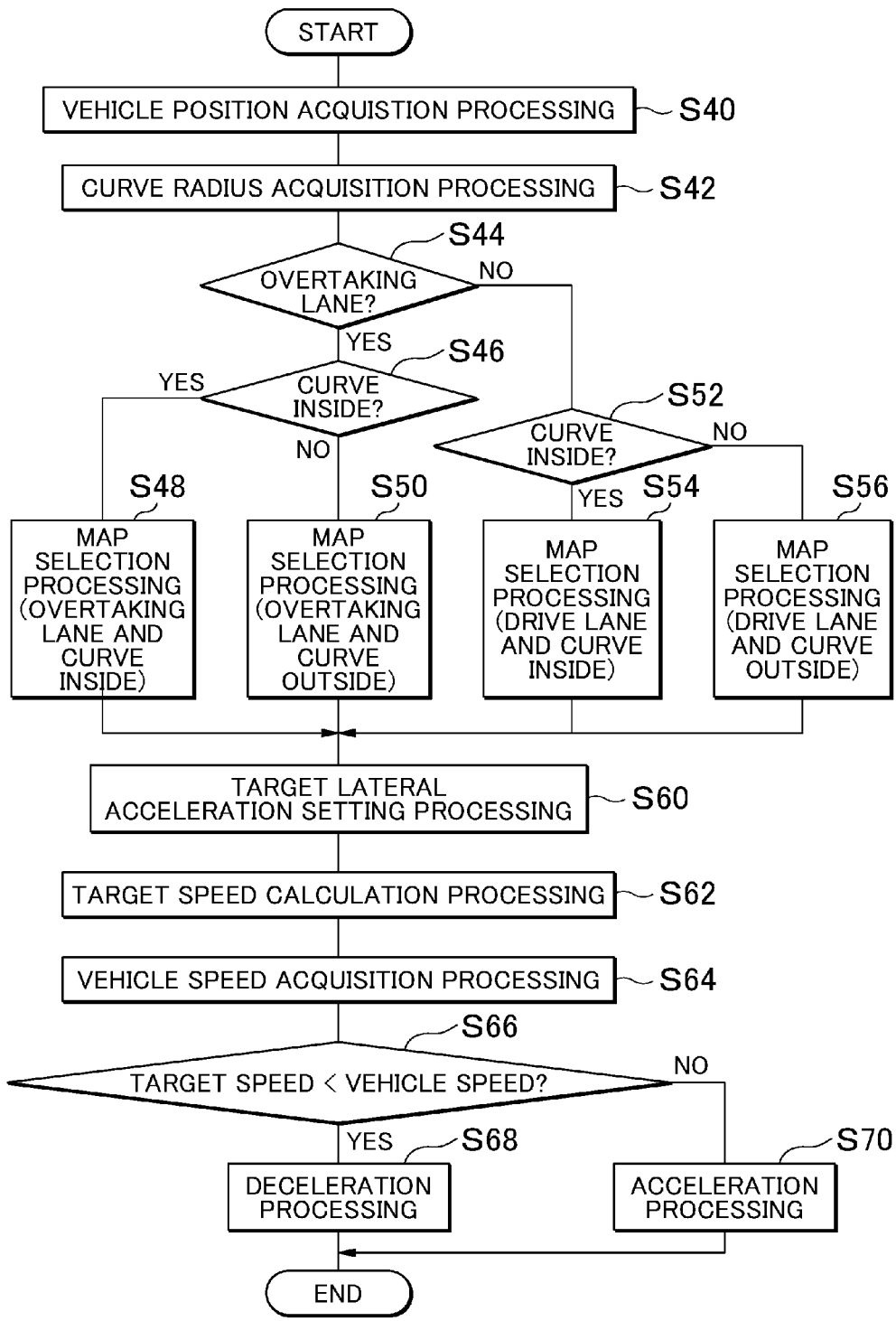
FIG. 8 is a flowchart of driving control processing of a vehicle control system in the second embodiment.

Next, driving control processing will be described. FIG. 8 is a flowchart of the driving control processing of the vehicle control system 100A. The flowchart illustrated in FIG. 8 is started at a timing such that a speed control ON/OFF switch is turned on, as an example.

As illustrated in FIG. 8, the vehicle position recognition unit 11 acquires the vehicle position of the vehicle V, as vehicle position acquisition processing (S40). This processing is the same as the vehicle position acquisition processing (S10) of FIG. 5.

Next, the curve radius acquisition unit 120 acquires the curve radius of a curve of a drive road in front of the vehicle V, as curve radius acquisition processing (S42). This processing is the same as the curve radius acquisition processing (S12) of FIG. 5.

Next, the lane determination unit 14 determines whether or not the lane on which the vehicle V is driving is the overtaking lane on the curve of the one-way multiple lanes, on the basis of the image information acquired by the image information acquisition unit 121, as lane determination processing (S44). This processing is the same as the lane determination processing (S14) of FIG. 5. In a case where it is determined that the lane on which the vehicle V is driving is the overtaking lane on the curve of the one-way multiple lanes on the lane determination processing (S44), the processing proceeds to curve inside determination processing (S46).

The lane information determination unit 15 determines whether or not the lane on which the vehicle V is driving is an outside lane of the curve or an inside lane of the curve in the one-way multiple lanes, on the basis of on the basis of the image information acquired by the image information acquisition unit 121, as curve inside determination processing (S46). For example, in the driving environment illustrated in FIG. 2, the lane information determination unit 15 recognizes that the lane on which the vehicle V drives is demarcated by the second lane boundary layer Li2 and the third lane boundary layer Li3 on the basis of the image information. Then, the lane information determination unit 15 determines whether or not the lane on which the vehicle V is driving is the inside lane of the curve in the one-way multiple lanes, on the basis of the curving direction of a road shape and the position of the lane on which the vehicle V is driving. Since the shape of the first lane boundary layer Li1 of the third road section D3 is curved in the rightward direction, and the second lane boundary layer Li2 on which the vehicle V drives is a rightmost lane of the one-way multiple lanes, the lane information determination unit 15 determines that the lane on which the vehicle V is driving in the second road section D2 is the inside lane of the curve in the one-way multiple lanes. In a case where it is determined that the lane on which the vehicle V is driving is the inside lane of the curve in the one-way multiple lanes on the curve inside determination processing (S46), the processing proceeds to map selection processing (S48).

The target lateral acceleration setting unit 16A selects the target lateral acceleration map for an overtaking lane and an inside lane of a curve, as map selection processing (S48). The target lateral acceleration setting unit 16A selects the target lateral acceleration map for an overtaking lane and an inside lane of a curve (for example, the fifth graph GA1 of FIG. 7) with reference to the storage unit 19 provided in the ECU 7. A target lateral acceleration in the same curve radius in the target lateral acceleration map for an overtaking lane is set to be greater than that in the target lateral acceleration map for a drive lane. Moreover, a target lateral acceleration in the same curve radius in the target lateral acceleration map for an overtaking lane and an inside lane of a curve is set to be greater than that in the target lateral acceleration map for an overtaking lane and an outside lane of a curve. If the map selection processing (S48) is completed, the processing proceeds to target lateral acceleration setting processing (S60).

On the other hand, in a case where it is not determined that the lane on which the vehicle V is driving is the inside lane of the curve in the one-way multiple lanes on the curve inside determination processing (S46), the processing proceeds to map selection processing (S50). The target lateral acceleration setting unit 16A selects the target lateral acceleration map for an overtaking lane and an outside lane of a curve, as the map selection processing (S50). The target lateral acceleration setting unit 16A selects the target lateral acceleration map for an overtaking lane and an outside lane of a curve (for example, the sixth graph GA2 of FIG. 3) with reference to the storage unit 19 provided in the ECU 7. A target lateral acceleration in the same curve radius in the target lateral acceleration map for an overtaking lane is set to be greater than that in the target lateral acceleration map for a drive lane. Moreover, a target lateral acceleration in the same curve radius in the target lateral acceleration map for an overtaking lane and an outside lane of a curve is set to be smaller than that in the target lateral acceleration map for an overtaking lane and an inside lane of a curve. If the map selection processing (S50) is completed, the processing proceeds to the target lateral acceleration setting processing (S60).

On the other hand, in a case where it is not determined that the lane on which the vehicle V is driving is the overtaking lane on the curve of the one-way multiple lanes on the lane determination processing (S44), the processing proceeds to curve inside determination processing (S52). The lane information determination unit 15 determines whether or not the lane on which the vehicle V is driving is the outside lane of the curve or the inside lane of the curve in the one-way multiple lanes, on the basis of on the basis of the image information acquired by the image information acquisition unit 121, as the curve inside determination processing (S52). This processing is the same as the curve inside determination processing (S46). In a case where it is determined that the lane on which the vehicle V is driving is the inside lane of the curve in the one-way multiple lanes on the curve inside determination processing (S52), the processing proceeds to map selection processing (S54).

The target lateral acceleration setting unit 16A selects the target lateral acceleration map for a drive lane and an inside lane of a curve, as the map selection processing (S54). The target lateral acceleration setting unit 16A selects the target lateral acceleration map for a drive lane and an inside lane of a curve (for example, the seventh graph GB1 of FIG. 7) with reference to the storage unit 19 provided in the ECU 7. A target lateral acceleration in the same curve radius in the target lateral acceleration map for a drive lane is set to be smaller than that in the target lateral acceleration map for an overtaking lane. Moreover, a target lateral acceleration in the same curve radius in the target lateral acceleration map for a drive lane and an inside lane of a curve is set to be greater than that in the target lateral acceleration map for a drive lane and an outside lane of a curve. If the map selection processing (S54) is completed, the processing proceeds to the target lateral acceleration setting processing (S60).

On the other hand, in a case where it is not determined that the lane on which the vehicle V is driving is the inside lane of the curve in the one-way multiple lanes on the curve inside determination processing (S52), the processing proceeds to map selection processing (S56). The target lateral acceleration setting unit 16A selects the target lateral acceleration map for a drive lane and an outside lane of a curve, as the map selection processing (S56). The target lateral acceleration setting unit 16A selects the target lateral acceleration map for a drive lane and an outside lane of a curve (for example, the eighth graph GB2 of FIG. 7) with reference to the storage unit 19 provided in the ECU 7. A target lateral acceleration in the same curve radius in the target lateral acceleration map for a drive lane is set to be smaller than that in the target lateral acceleration map for an overtaking lane. Moreover, a target lateral acceleration in the same curve radius in the target lateral acceleration map for a drive lane and an outside lane of a curve is set to be smaller than that in the target lateral acceleration map for a drive lane and an inside lane of a curve. If the map selection processing (S56) is completed, the processing proceeds to the target lateral acceleration setting processing (S60).

The target lateral acceleration setting unit 16A sets a target lateral acceleration, on the basis of the curve radius acquired on the curve radius acquisition processing (S42) and the target lateral acceleration map selected in the selection processing (S48 or S56), as the target lateral acceleration setting processing (S60). If the target lateral acceleration setting processing (S60) is completed, the processing proceeds to target speed calculation processing (S62).

Since the target speed calculation processing (S62), vehicle speed acquisition processing (S64), speed determination processing (S66), deceleration processing (S68), and acceleration processing (S70) are respectively the same as the target speed calculation processing (S22), the vehicle speed acquisition processing (S24), the speed determination processing (S26), the deceleration processing (S28), and the acceleration processing (S30) that are illustrated in FIG. 5, the description thereof will be omitted.

In a case where the driving control processing illustrated in FIG. 8 is completed, the processing is again executed in order from S40. That is, the driving control processing illustrated in FIG. 8 is repeatedly executed. In addition, in a case where the speed control ON/OFF switch is turned off, the driving control processing is not repeatedly executed even in a case where the deceleration processing (S68) or the acceleration processing (S70) is completed.

As described above, according to the vehicle driving control device 1A according to the second embodiment, even in a case where a target speed lower than the current speed of a vehicle is set according to the shape of the drive road in front of the vehicle V, when the lane determination unit 14 determines that the lane on which the vehicle V is driving is the overtaking lane, the target speed when the vehicle V drives on the inside lane of the curve can be set to be higher than the target speed when the vehicle V drives on the outside lane of the curve. Additionally, there is a tendency in which a driver allows the vehicle to drive at a higher speed than that in the outside lane of the curve because a greater space outside the vehicle than that in the outside lane of the curve is secured, when the vehicle is driving on the inside lane of the curve in the one-way multiple lanes, even in a case where the vehicle V is decelerated so as to have the target speed set according to the shape of the drive road in front of the vehicle V. That is, the vehicle driving control device 1A can make the vehicle V drive at a higher speed than that in the outside lane of the curve, when the vehicle is driving on the inside lane of the curve, in a case where the vehicle V is decelerated according to the road shape of the drive road in front of the vehicle V in consideration of such a driver's tendency.

Additionally, as described above, upper limits or lower limits of target speeds assumed by a driver are different from each other in the inside lane of the curve and the outside lane of the curve. For this reason, if the target speeds are equally set according to a curve shape, there is a concern that drivability may degrade particularly when a vehicle is driving on the inside lane of the curve or the outside lane of the curve. Since the vehicle driving control device 1 according to the second embodiment can calculate the target speeds that are different from each other in the inside lane of the curve and the outside lane of the curve and can calculate the target speed of the inside lane of the curve to be higher than the target speed of the outside lane of the curve, degradation of drivability can be avoided.

Although the embodiments of the disclosure have been described above, the disclosure is not limited to the above-described embodiments. The disclosure can be implemented in various forms in which various changes and improvements are made to the above-described embodiments on the basis of the knowledge of a person's skilled in the art.

Figure 9:
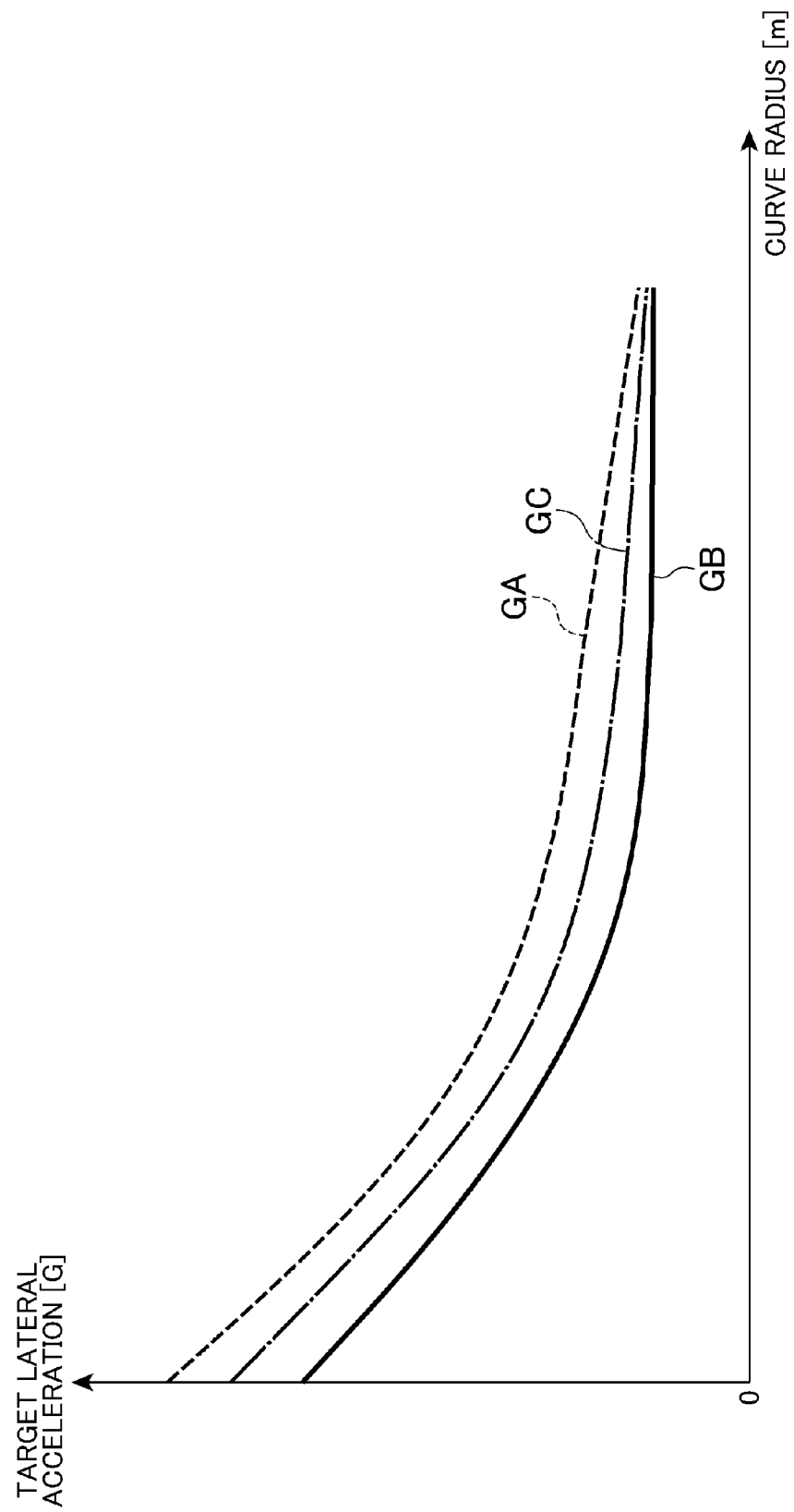
FIG. 9 is still another example of target lateral acceleration maps (graphs) illustrating relationships between target lateral accelerations and curve radii.

For example, although an example in which the vehicle V drives on the road of one-way double lanes as illustrated in FIG. 2 has been described in the above-described first embodiment, cases where the vehicle V drives on roads equal to or more than one-way three lanes may be adopted. In the first embodiment, even in the road of one-way three lanes, target lateral acceleration maps are set such that the target lateral acceleration of the overtaking lane becomes greater than the target lateral accelerations of the other two lanes. Here, it is supposed that three lanes of a first drive lane, a second drive lane, and the overtaking lane, are present sequentially from the left. Target lateral acceleration maps in this case are illustrated in FIG. 9. FIG. 9 is still another example of the target lateral acceleration maps (graphs) illustrating relationships between target lateral accelerations and curve radii. As illustrated in FIG. 9, a first graph GA is a target lateral acceleration map for an overtaking lane, a second graph GB is a target lateral acceleration map for a first drive lane, and a third graph GC is a target lateral acceleration map for a second drive lane. In this case, even in three or more lanes, by setting the target lateral acceleration maps for respective lanes, a vehicle can be made to drive at a higher speed than that when the vehicle is not driving on an overtaking lane, when the vehicle drives on the overtaking lane, in a case where the vehicle is decelerated according to the shape of a drive road in front of the vehicle. Additionally, the second embodiment is not limited to the road of one-way double lanes, and may be a road of one-way three lanes or more.

Additionally, in the above-described first and second embodiments, an example in which a curve radius is acquired from the map database 5 provided in the vehicle V has been described as an example in which the curve radius is acquired. However, the curve radius acquisition unit 120 may use a curve radius that the vehicle V has learned. For example, the vehicle V just has to include a steering sensor that detects the amount of steering, as the internal sensor 4, and just has to store a curve radius and a driving position obtained from the amount of steering in the storage unit 19 of the vehicle V. Otherwise, a configuration may be adopted in which a computer of a facility, such as an information processing center, communicates with the vehicle V and other vehicles, the curve radius of the learned map database 5 provided in each vehicle is collected, and the collected curve radius is transmitted to the vehicle V. Additionally, the curve radius acquisition unit 120 may be configured to be able to acquire a curve radius in the map database 5 of the vehicle V, a curve radius acquired by learning, a curve radius in a computer of a facility, and the acquired curve radii may be adopted. When the curve radius acquisition unit 120 has been able to acquire a plurality of radii in a case where the curve radius acquisition unit is configured in this way, the curve radius acquired by learning, the curve radius in the map database 5 of the vehicle V, and the curve radius in a computer of a facility just have to be preferentially adopted in this order.

Additionally, although an example in which speed control is performed using a curve radius has been described in the above-described first and second embodiments, road curvature may be used instead of the curve radius. The road curvature is an inverse number of the curve radius.

Additionally, in the above-described first and second embodiments, the external sensor 2 may also further include a radar or a laser imaging detection and ranging (LIDAR). Additionally, other means capable of specifying the latitude and the longitude where the vehicle V is present may be used instead of the GPS receiving unit 3. Additionally the internal sensor 4 may also further include an acceleration sensor or a yawing rate sensor. Additionally, the map database 5 may be stored in a computer of a facility, such as an information processing center, which can communicate with the vehicle V. The vehicle V may include a communication unit. The communication unit is a communication device that performs load-to-vehicle communication. The communication unit may be constituted of a wireless module loaded with a high-frequency circuit, and an antenna. The communication unit communicates with a computer of a facility, such as an information processing center, and acquires map information or the like. The communication unit outputs the map information or the like to the ECU 7. In addition, the communication unit may further include a road-to-vehicle communication function.

Additionally, in the above-described first and second embodiments, the actuator 6 further includes a steering actuator in a case where the ECU 7 performs not only the speed control but also steering control. The steering actuator controls driving of a assistant motor, which controls steering torque in an electric power steering system, according to a control signal from the ECU 7. Accordingly, the steering actuator controls the steering torque of the vehicle V.

Additionally, in the above-described first and second embodiments, it is described that the rule for discriminating an overtaking lane, the relationships between the overtaking lane and the line types of the lane boundary lines, and the target lateral acceleration maps are stored in the storage unit 19 of the ECU 7. However, these may be stored in storage units other than the ECU 7.

Additionally in the above-described first and second embodiments, the vehicle V may include a navigation system. In this case, the vehicle position recognition unit 11 may acquire and recognize a vehicle position to be used for the navigation system, from this navigation system. Otherwise, in a case where a vehicle position can be measured by a sensor installed outside, such as a road, the vehicle position recognition unit 11 may acquire the vehicle position from this sensor through communication via the communication unit.

Additionally in the above-described first and second embodiments, the curve radius acquisition unit 120 may acquire a curve radius on a curve of a drive road in front of the vehicle V through load-to-vehicle communication or vehicle-to-vehicle communication via the communication unit. Otherwise, the curve radius acquisition unit 120 may recognize lane boundary lines on the basis of the image information acquired by image information acquisition unit 121 to be described below, and may calculate a curve radius on a curve of a drive road in front of the vehicle V on the basis of the shape of the lane boundary lines. Otherwise, the curve radius acquisition unit 120 may recognize lane boundary lines on the basis of white line recognition results of the radar or the LIDAR, and may calculate a curve radius on a curve of a drive road in front of the vehicle V on the basis of the shape of the lane boundary lines.

Additionally in the above-described first and second embodiments, the curve radius acquisition unit 120 may recognize the section of a curve on the basis of the map information of the map database 5, without using a curve radius. In this case, information on whether or not respective road sections are curves just has to be associated with the map information in advance.

Additionally in the above-described first and second embodiments, the external situation recognition unit 12 may acquire other peripheral information from the external sensor 2 and the communication unit as well as the curve radius and the image information. The other peripheral information is the number of lanes of drive roads, the positions of lane boundary lines, the positions of centerlines, branch points, junctions, traffic restrictions, the positions of lane centers, or the width of streets. Additionally, the driving state recognition unit 13 may acquire not only the speed of the vehicle V but also acceleration information of the acceleration sensor, yawing rate information of the yawing rate sensor, and the like as driving states of the vehicle V.

Additionally in the above-described first and second embodiments, the lane determination unit 14 may perform final determination by combining a determination result based on the image information and a determination result based on the other information. Hereinafter, an example of determination processing based on the other information will be described. The lane determination unit 14 determines whether or not the lane on which the vehicle V is driving is the one-way multiple lanes, on the basis of the vehicle position recognized by the vehicle position recognition unit 11 and the map information of the map database 5. That is, the lane determination unit 14 determines whether or not the lane on which the vehicle V is driving is the one-way multiple lanes, on the basis of the number of lanes associated with the map information corresponding to the position of the vehicle V, and the positional information of the vehicle V. Then, the lane determination unit 14 recognizes the lane on which the vehicle V is driving from the multiple lanes, on the basis of the vehicle position of the vehicle V and the map information. In this way, the position of the lane on which the vehicle V is driving may be recognized using the information other than the image information, and whether or not the vehicle V is driving on an overtaking lane may be determined from the recognition result. The lane determination unit 14 may determine whether or not the lane on which the vehicle V is driving is an overtaking lane, on the basis of the image information, in a case where it is determined that the lane on which the vehicle V is driving is the overtaking lane on the basis of the other information.

What is claimed is:

1. A vehicle driving control device comprising:
   a curve radius acquisition unit configured to acquire a radius of a curve of a drive road in front of a vehicle;
   a target lateral acceleration setting unit configured to set a target lateral acceleration on the curve on the basis of the radius;
   a target speed calculation unit configured to calculate a target speed on the curve on the basis of the target lateral acceleration and the radius;
   a speed acquisition unit configured to acquire a speed of the vehicle;
   a speed control unit configured to control the speed of the vehicle on the curve on the basis of the target speed and the speed of the vehicle;
   an image information acquisition unit configured to acquire image information obtained by imaging surroundings of the vehicle; and
   a lane determination unit configured to determine whether or not a lane on which the vehicle is driving is an overtaking lane in one-way multiple lanes in the drive road on the basis of the image information,
   wherein the target lateral acceleration setting unit sets the target lateral acceleration on the curve to be higher than the target lateral acceleration on the curve when it is determined that the lane on which the vehicle is driving is not the overtaking lane in a case where it is determined that the lane on which the vehicle is driving is the overtaking lane, and
   wherein the speed control unit performs the speed control of reducing the speed of the vehicle in accordance with the target speed, in a case where the speed of the vehicle is greater than the target speed.

2. The vehicle driving control device according to claim 1, further comprising:
   a lane information determination unit configured to determine whether or not the lane on which the vehicle is driving is an outside lane of the curve or an inside lane of the curve in one-way multiple lanes on the basis of the image information,
   wherein the target lateral acceleration setting unit sets the target lateral acceleration on the curve to be higher than the target lateral acceleration on the curve when the lane information determination unit determines that the lane on which the vehicle is driving is the outside lane of the curve, in a case where the lane determination unit determines that the lane on which the vehicle is driving is the overtaking lane and the lane information determination unit determines that the lane on which the vehicle is driving is the inside lane of the curve.

3. A control device comprising:
   an actuator that executes driving control of a vehicle; and
   an electronic controller configured to execute
   acquiring a radius of a curve of a drive road in front of the vehicle, setting a target lateral acceleration on the curve on the basis of the radius,
calculating a target speed on the curve on the basis of the target lateral acceleration and the radius,
acquiring a speed of the vehicle,
controlling the speed of the vehicle on the curve on the basis of the target speed and the speed of the vehicle,
acquiring image information obtained by imaging surroundings of the vehicle, and
determining whether or not a lane on which the vehicle is driving is an overtaking lane in the drive road on the basis of the image information,
wherein the electronic controller sets the target lateral acceleration in a case where it is determined that the lane on which the vehicle is driving is the overtaking lane to be higher than the target lateral acceleration in a case where it is determined that the lane on which the vehicle is driving is not the overtaking lane, and
wherein in a case where the speed of the vehicle is greater than the target speed, the electronic controller transmits a control signal to the actuator so as to perform the speed control of reducing the speed of the vehicle in accordance with the target speed.

\* \* \* \* \*